Jan. 10, 1928.
B. CAVACCHIOLI
RESILIENT WHEEL
Filed Jan. 31, 1927
1,656,141
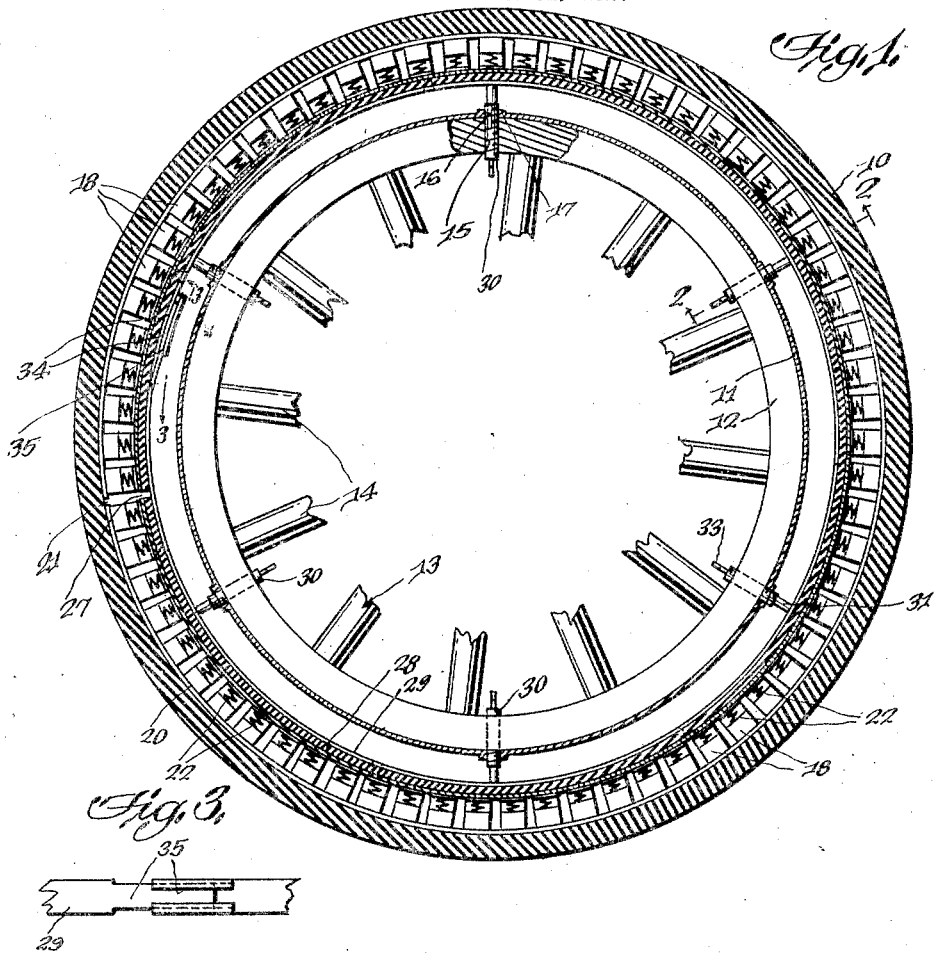
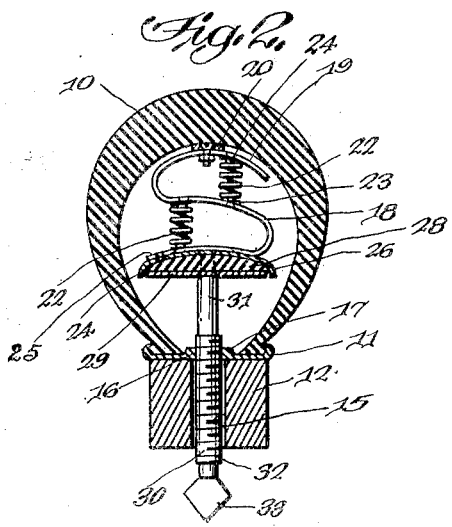
Bernardo Cavacchioli
INVENTOR
BY Victor J. Evans
ATTORNEY Patented Jan. 10, 1928.

1,656,141

UNITED STATES PATENT OFFICE.

BERNARDO CAVACCHIOLI, OF CHICAGO, ILLINOIS.

RESILIENT WHEEL.

Application filed January 31, 1927. Serial No. 164,961.

This invention relates to certain novel improvements in resilient wheels and has for its principal object the provision of an improved construction of this character which will be highly efficient in use and economical in manufacture.

Among the several objects of the invention is the provision of a spring wheel which has associated therewith the usual rubber tire and mounted in this tire in lieu of the ordinary pneumatic tube is cushioning mechanism thereby eliminating punctures which frequently happen with the ordinary pneumatic tire.

A still further object of the invention is the provision of a resilient wheel having cushioning mechanism selectively arranged in assembled position for expeditious insertion in the ordinary rubber tire carried by the felly rim.

A still further object of the invention is the provision of a rubber tire having cushioning means arranged therein in lieu of the ordinary pneumatic tube with means for properly adjusting the cushioning means circumferentially about the felly of the wheel.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a vertical sectional detail view of the invention;

Fig. 2 is a sectional detail view taken substantially on line 2—2 of Fig. 1;

Fig. 3 is a fragmentary plan view taken substantially on line 3—3 of Fig. 1.

As hereintofore indicated, it is an object of the invention to provide a cushioning means for a vehicle wheel to take the place of the ordinary pneumatic tube whereby to avoid the frequent trouble such as punctures and blow-outs as occur to a vehicle wheel having the pneumatic tube associated therewith. To accomplish this and other objects of the invention I associate my cushioning means with the ordinary standard tire 10. This tire 10 is connected in a well-known manner to a rim 11 mounted circumferentially about the felly 12 of a wheel 13 having the usual spokes 14. Formed in the felly 12 at opposite diametrical points are radially extending openings 15 which register with openings 16 formed in bosses 17, said openings 16 being threaded for reasons hereinafter set forth.

The cushioning means embodying my invention comprises a plurality of S-shaped springs 18 having corresponding end portions 19 secured to the outer ring 20 which is split as at 21. Arranged between the convolutions of the springs 18 are auxiliary springs 22. The end convolutions 23 of these auxiliary springs 22 embrace studs 24 secured to the springs 18, said studs 24 functioning to retain the auxiliary springs 22 in proper relation. The opposite corresponding end portions 25 of the springs 18 are secured to an intermediate ring 26 split as at 27. This intermediate ring is concaved in cross-section and arranged in the concaved portion is a compressible ring 28. This compressible ring 28 is supported circumferentially about an inner ring 29. Extending radially and inwardly from the inner ring 29 are a plurality of adjusting bolts 30. The outer end portions 31 of these bolts are arranged in abutment with an inner ring 29 as best shown in Fig. 2.

The bolts have threaded portions 32 which are adapted to mesh with the threads of the opening 16. The inner end portions of these bolts project inwardly through the openings 15 and formed on their extremities are flat heads 33 upon which is adapted to be manipulated a suitable tool (not shown) for adjusting the adjusting bolts relative to the felly 10.

The inner ring 29 has its opposite end portions 34 slidably connected together through the medium of a tongue and groove connection 35.

In use the cushioning mechanism is arranged in the tire 10 and after this has been accomplished the bolts 30 are adjusted to properly set the springs and their respective rings in proper position to give the desired resiliency to the tire 10.

It will be manifest that when the tire is tractioned the springs embodying the invention will act to keep the tire in its proper inflated condition while at the same time permit sufficient compression when the tire is tractioned over an uneven road.

By providing the rings 26 and 29 of the split type it will be manifest that insertion and removal of the cushioning mechanism from the tire 10 may be expeditiously accomplished.

It will be seen from the description herein that the tire to be inflated does not require air and that the inflated condition of the tire is maintained through the medium of the spring members embodying the invention.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. The combination with a felly of a vehicle wheel, a tire rim mounted on the felly and a tire carried by the tire rim, of cushioning mechanism arranged within the tire, and means carried by the tire rim and operable on the cushioning mechanism for adjusting said cushioning mechanism radially with respect to the tire, said cushioning mechanism including two concentrically spaced ring members, S shaped spring members disposed transversely between and having their opposite end portions connected to said rings, and auxiliary spring members extending radially between and abutting the convolutions of said S shaped spring members.

2. The combination with a felly of a vehicle wheel, a tire rim mounted on the felly and a tire carried by the tire rim, of cushioning mechanism arranged within the tire, means carried by the tire rim and operable on the cushioning mechanism for adjusting said cushioning mechanism radially with respect to the tire, said cushioning mechanism including two concentrically spaced split ring members, S shaped spring members disposed transversely between and having their opposite end portions connected to said rings, and auxiliary spring members extending radially between and abutting the convolutions of said S shaped spring members.

3. The combination with a felly of a vehicle wheel, a tire rim mounted on the felly and a tire carried by the tire rim, of cushioning mechanism arranged within the tire, means carried by the tire rim and operable on the cushioning mechanism for adjusting said cushioning mechanism radially with respect to the tire, said cushioning mechanism including two concentrically spaced ring members, S shaped spring members disposed transversely between and having their opposite end portions connected to said rings, auxiliary spring members extending radially between and abutting the convolutions of said S shaped spring members, an inner split ring member arranged concentrically with respect to one of said first mentioned ring members and having its end portions slidably connected together, and a compressible member arranged between said inner ring member and said one of the first mentioned ring members.

In testimony whereof I affix my signature.

BERNARDO CAVACCHIOLI.